United States Patent
King

(10) Patent No.: US 8,002,686 B2
(45) Date of Patent: Aug. 23, 2011

(54) TOOL CHANGER AND TOOL CHANGE METHOD

(75) Inventor: Yueh-Hsun King, Taipei Hsien (TW)

(73) Assignee: Foxnum Technology Co., Ltd., Tu-Cheng, New Taipei (TW)

( * ) Notice: Subject to any disclaimer, the term of this patent is extended or adjusted under 35 U.S.C. 154(b) by 281 days.

(21) Appl. No.: 12/425,404

(22) Filed: Apr. 17, 2009

(65) Prior Publication Data

US 2010/0210432 A1 Aug. 19, 2010

(30) Foreign Application Priority Data

Feb. 17, 2009 (CN) .......................... 2009 1 0300454

(51) Int. Cl.
*B23Q 3/157* (2006.01)

(52) U.S. Cl. .................. 483/1; 483/37; 483/55; 483/56; 483/63; 483/67

(58) Field of Classification Search ................. 483/1, 37, 483/56, 55, 63–64, 54, 67, 66, 40–41, 48–49, 483/51, 53, 52
See application file for complete search history.

(56) References Cited

U.S. PATENT DOCUMENTS 5,762,594 A * 6/1998 Hoppe .............................. 483/56
6,039,680 A * 3/2000 Oketani et al. ................... 483/57

FOREIGN PATENT DOCUMENTS

| CN | 2100269 U | | 4/1992 |
| EP | 60638 A2 | * | 9/1982 |
| JP | 61-086156 A | * | 5/1986 |

OTHER PUBLICATIONS

Heyligen staedt, "Tool Changing in a Flash", World Manufacturing Engineering & Market, 2001, No. 2, pp. 12-13, Beijing, China, Paragraph 2 of this article may be Relevant.

* cited by examiner

*Primary Examiner* — Erica E Cadugan
(74) *Attorney, Agent, or Firm* — Zhigang Ma

(57) ABSTRACT

A tool changer includes a spindle including a first collet, an auxiliary arm having a second collet, a tool-pan having a plurality of tool-seats, and an auxiliary tool-magazine. The auxiliary tool-magazine comprises a main body, a turnplate rotatable relative to the main body, a first tool-carrier attached to the turnplate, and a second tool-carrier attached to the turnplate.

8 Claims, 10 Drawing Sheets

TOOL CHANGER AND TOOL CHANGE METHOD

BACKGROUND

1. Technical Field

The disclosure relates to tool changing, and particularly, to a tool changer and a tool change method for a drilling machine for printed circuit boards (PCBs).

2. Description of Related Art

FIG. 10 illustrates a PCB drilling machine including a spindle 1. The spindle comprises a first tool 2 fixed in a collet 5 of the spindle 1 for drilling holes in a PCB. The first tool 2 requires frequent changing from a plurality of second tools 4 carried in a tool-pan 3. Because the space between adjacent second tools 4 is too small, acquisition thereof directly by the collet 5 of the spindle 1 is difficult to achieve. Therefore, an auxiliary arm 6 and an auxiliary tool-magazine 7 are required. The auxiliary arm 6 retrieves a second tool 4 from the tool-pan 3 and loads the second tool 4 into the auxiliary tool-magazine 7 which provides sufficient space for the collet 5 of the spindle 1 to retrieve the second tool 4 therefrom. Changing the first tool 2 by the tool 4 usually includes locating the auxiliary arm 6 over the tool-pan 3, lowering the auxiliary arm 6 and retrieving the second tool 4 therewith, thereby emptying a seat in the tool-pan 3, elevating the auxiliary arm 6, repositioning the auxiliary arm 6 over a first tool-carrier 8 of the auxiliary tool-magazine 7, lowering the auxiliary arm 6 and locating the second tool 4 into the first tool-carrier 8, elevating the auxiliary arm 6 again, relocating the spindle 1 over a second tool-carrier 9 of the auxiliary tool-magazine 7, lowering the spindle 1 and placing the first tool 2 into the second tool-carrier 9, elevating the spindle 1, relocating the auxiliary arm 6 over the second tool-carrier 9, relocating the spindle 1 over the first tool-carrier 8, lowering the auxiliary arm 6 and retrieving the first tool 2, lowering spindle 1 and retrieving the second tool 4, elevating the spindle 1 and the auxiliary arm 6, starting the spindle 1 rotation, relocating the auxiliary arm 6 over the empty seat of the tool-pan 3, lowering the auxiliary arm 6, and depositing first tool 2 into the empty seat of tool-pan 3. The above-mentioned process can be very time consuming.

Thus, an improved system and method for changing tools is needed.

DETAILED DESCRIPTION

Figure 1:
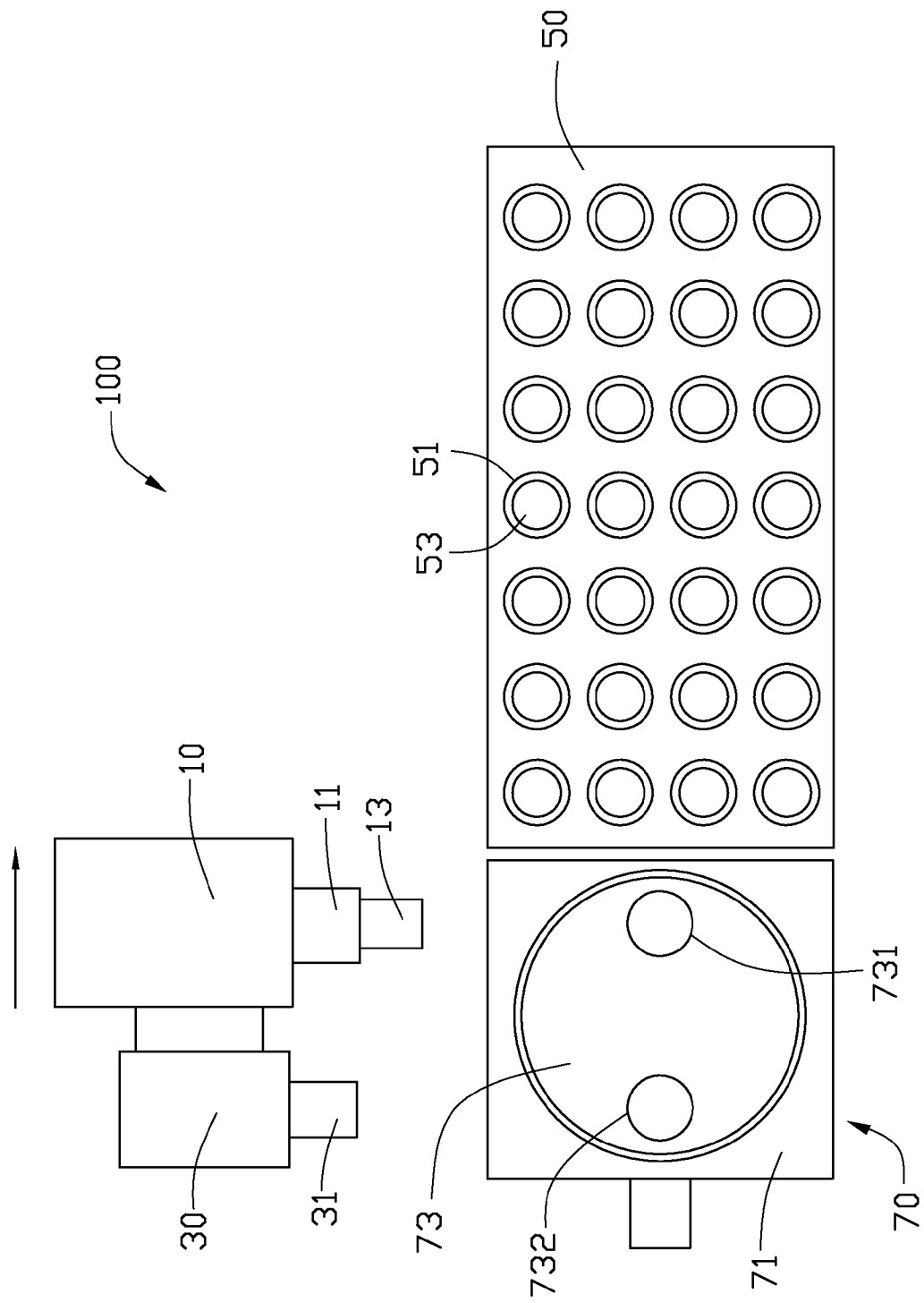
FIGS. 1 to 7 are schematic drawings showing an exemplary embodiment of a tool changer in different working steps, the tool changer having an auxiliary tool-magazine.

Referring to FIG. 1, an embodiment of a tool changer 100 of a drill machine includes a spindle 10, an auxiliary arm 30, a tool-pan 50, and an auxiliary tool-magazine 70.

The spindle 10 includes a first collet 11. During operation, a first tool 13 is fixed in the first collet 11.

The auxiliary arm 30 includes a second collet 31. The auxiliary arm 30 can be set to move synchronously or non-synchronously with the spindle 10. If the auxiliary arm 30 and the spindle 10 are synchronous, the auxiliary arm 30 may be fixed to the spindle 10. If is the auxiliary arm 30 and the spindle 10 are non-synchronous, the auxiliary arm 30 and the spindle 10 may be slidably co-mounted on a beam (not shown) respectively, moveable up and down relative to the beam. Here, a synchronous operation is disclosed as an example in the description of the present disclosure.

The tool-pan 50 includes a plurality of tool-seats 51 bearing a plurality of second tools 53.

The auxiliary tool-magazine 70 includes a main body 71 and a turnplate 73 rotatable relative to the main body 71. The turnplate 73 includes a first tool-carrier 731 and a second tool-carrier 732. In the present disclosure, the first tool-carrier 731 and the second tool-carrier 732 are disposed equidistant from a centre of the turnplate 73.

A method of changing tools using a device such as, for example, the tool changer 100, includes the following steps.

Figure 2:
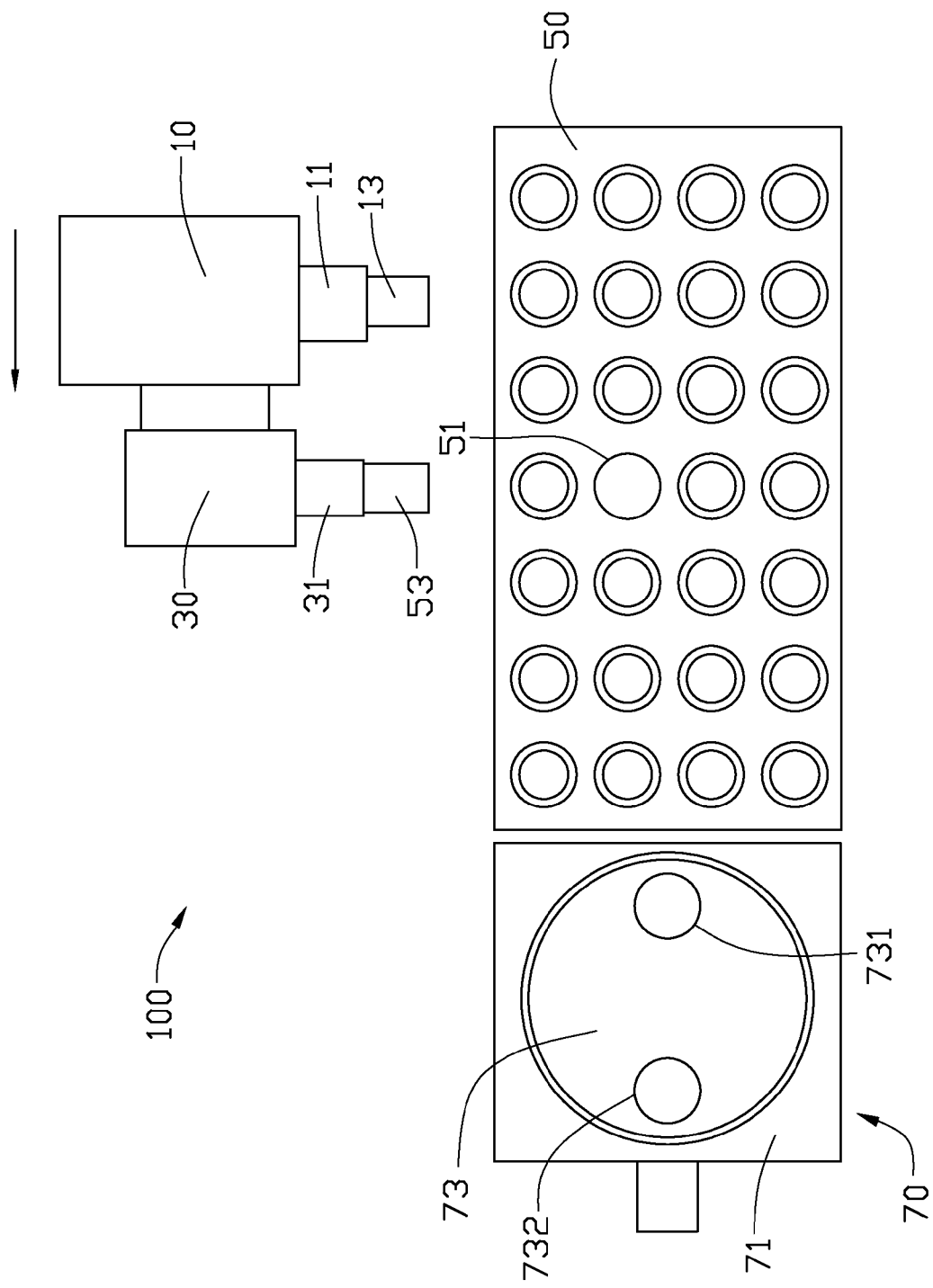

Referring to FIGS. 1 and 2, the auxiliary arm 30 is relocated over the tool-pan 50.

The second collet 31 together with the auxiliary arm 30 is lowered and retrieves the second tool 53, thereby emptying the tool-seat 51 originally seating the second tool 53.

The auxiliary arm 30 is elevated.

Figure 3:
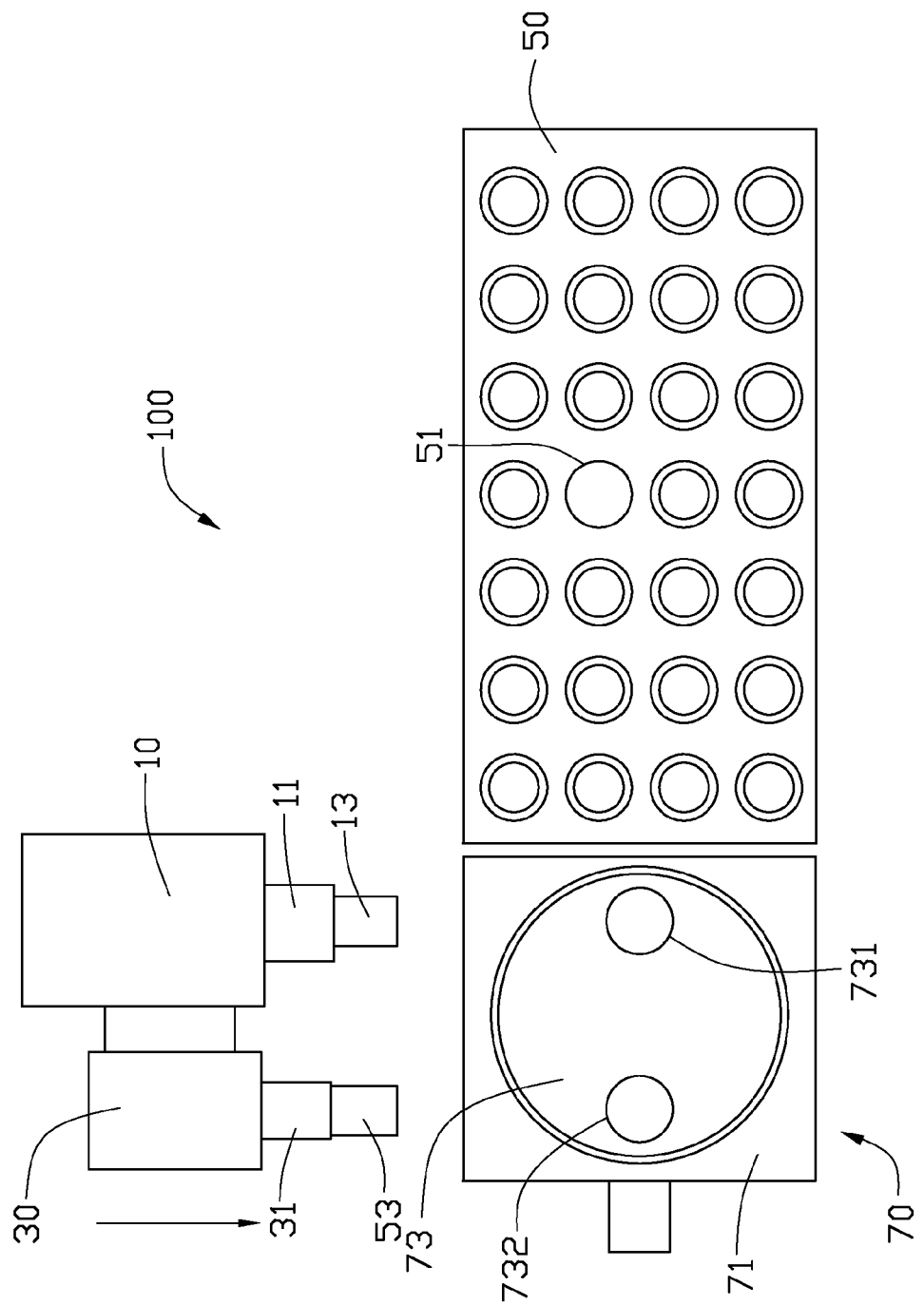

Referring to FIG. 3, the spindle 10 and the auxiliary arm 30 are relocated over the first tool-carrier 731 and the second tool-carrier 732 of the auxiliary tool-magazine 73, respectively.

Figure 4:
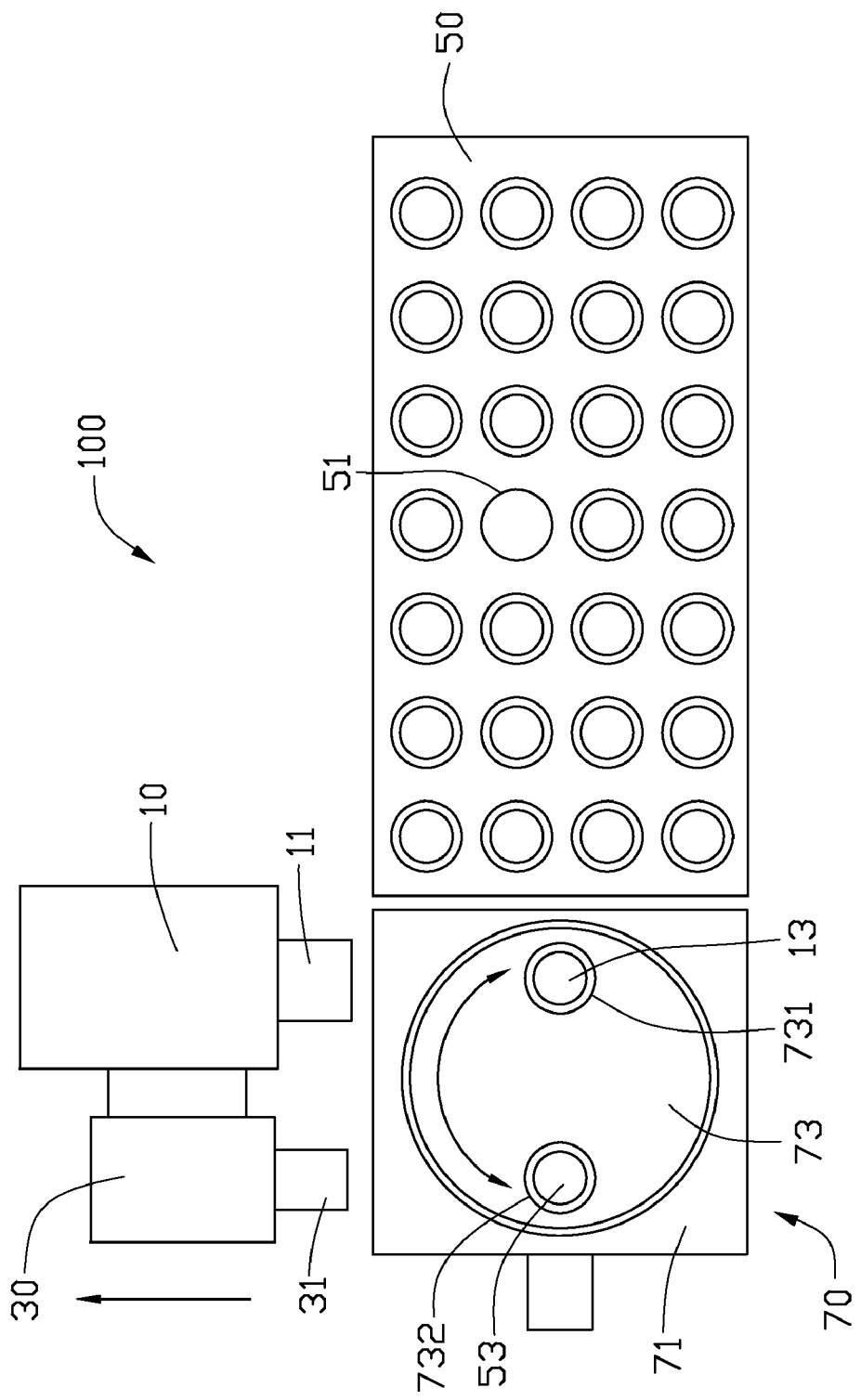

Referring to FIG. 4, the spindle 10 is lowered and places the first tool 13, fixed in the first collet 11, into the first tool-carrier 731, and the auxiliary arm 30 is lowered to place the second tool 53, fixed in the second collet 31, into the second tool-carrier 732.

The spindle 10 and the auxiliary arm 30 are elevated, the turnplate 73 is rotated, and positions of the first tool-carrier 731 and the second tool-carrier 732 are exchanged.

Figure 5:
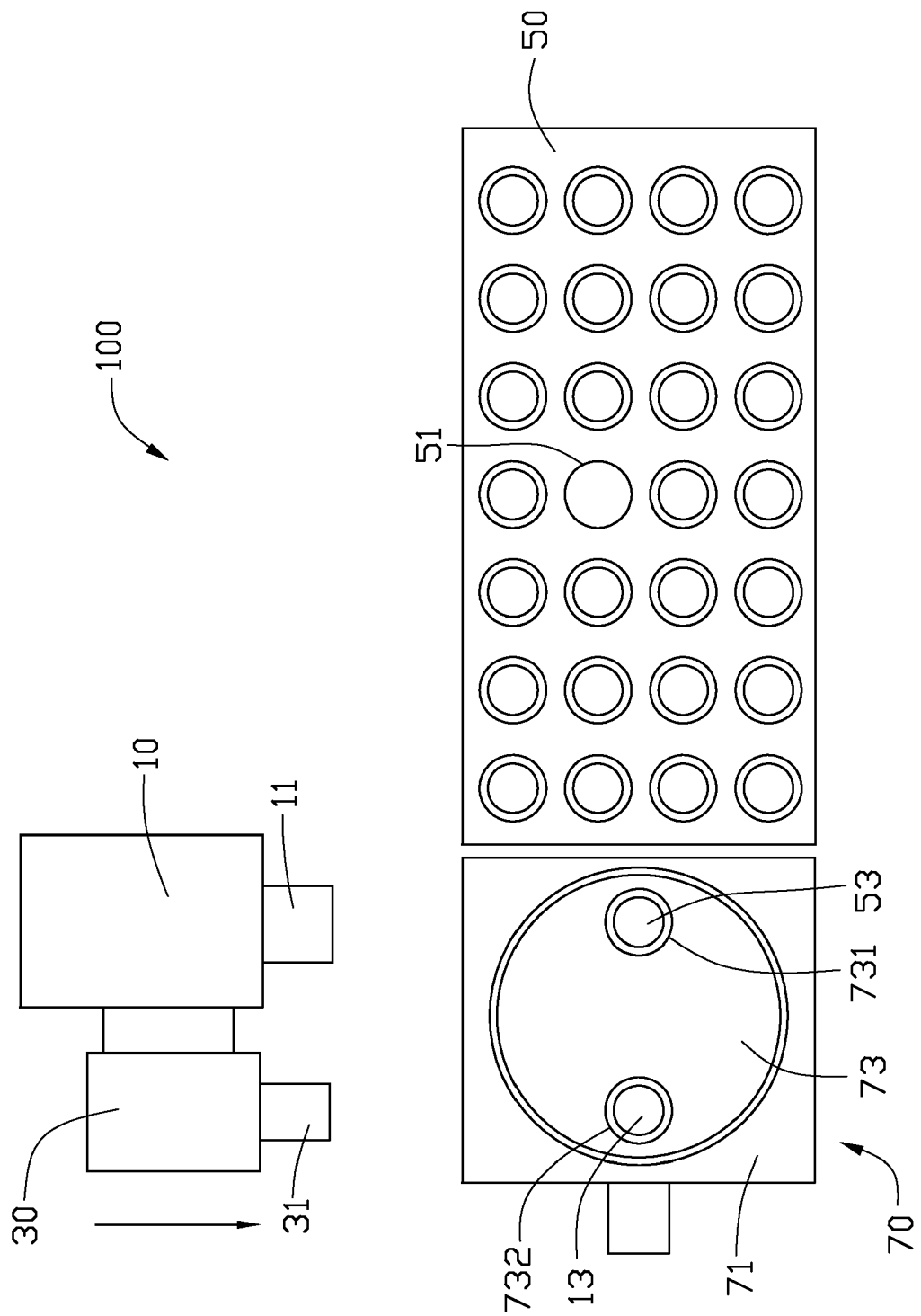

Referring to FIG. 5, the first collet 11 together with the spindle 10 is lowered to retrieve the second tool 53 from the second tool-carrier 732, and the second collet 31 together with the auxiliary arm 30 is lowered to retrieve the first tool 11 from the first tool-carrier 731.

The spindle 10 and the auxiliary arm 30 are elevated, the spindle 10 initiates rotation, and the second tool 53 fixed in the first collet 11 of the spindle 10 is ready to work.

Figure 6:
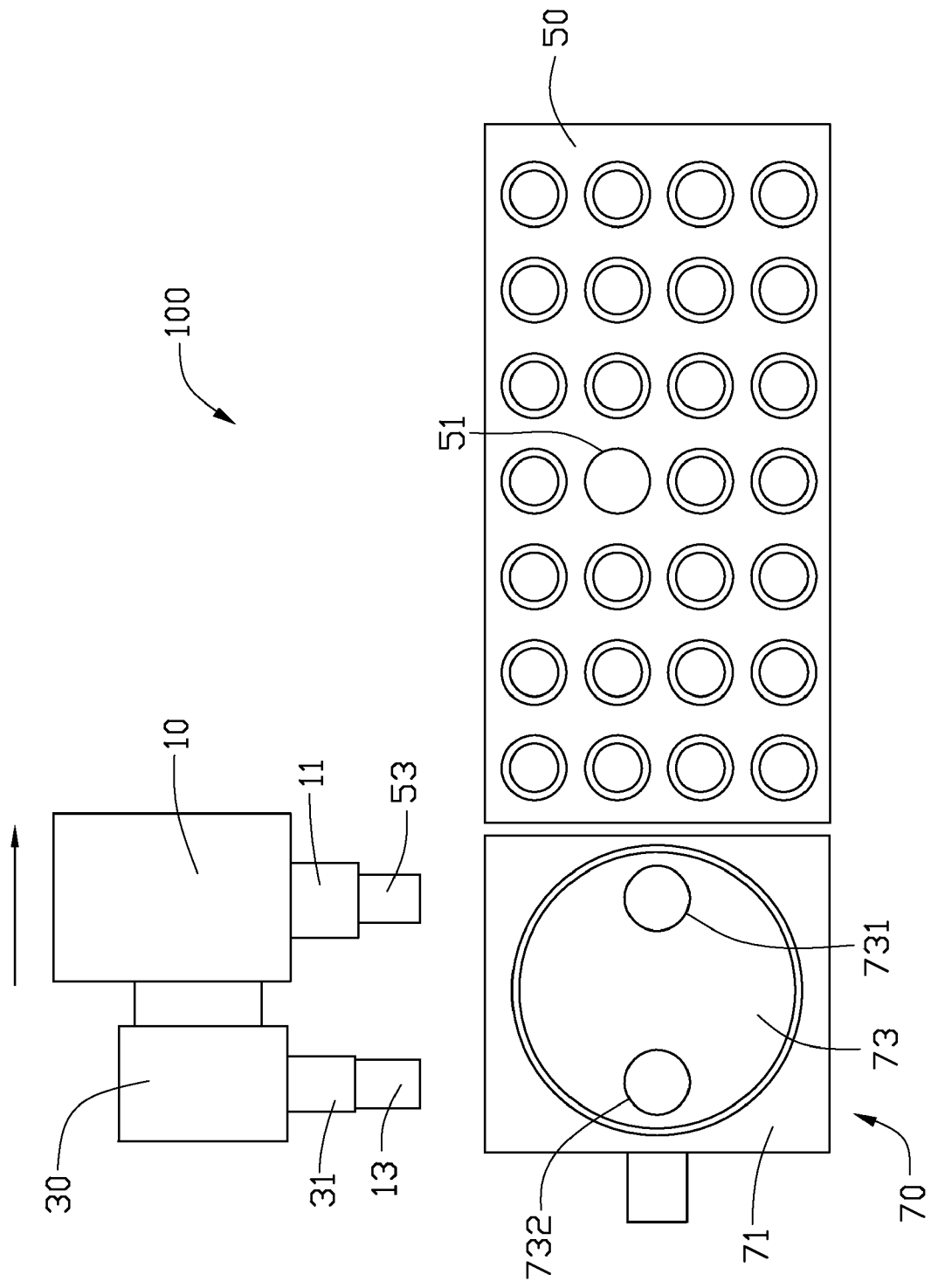
Figure 7:
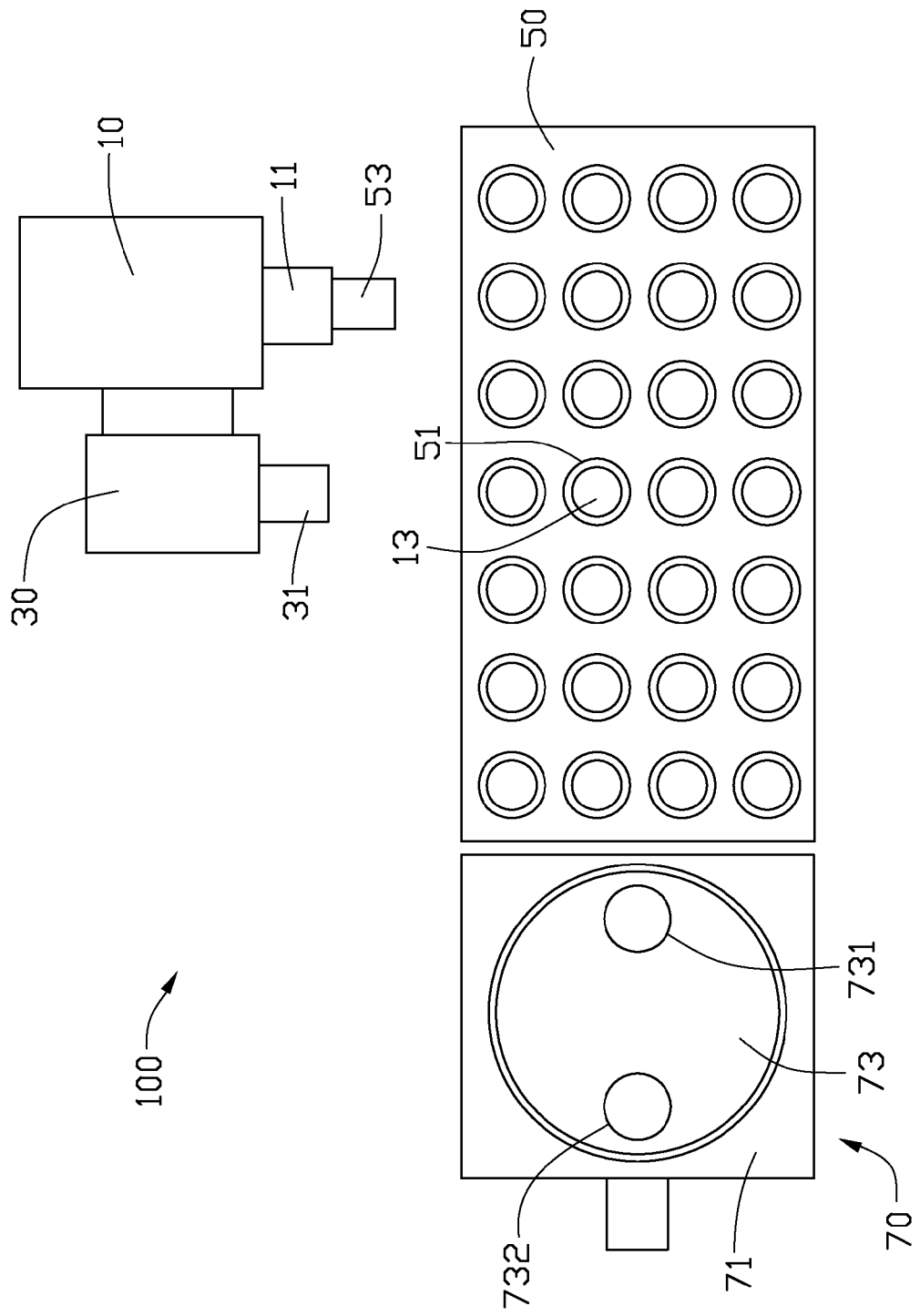

Referring to FIGS. 6 and 7, the auxiliary arm 30 is relocated over tool-seat 51 of the tool-pan 50.

The auxiliary arm 30 is lowered to deposit the first tool 13 fixed in the second collet 31 into the tool-seat 51.

According to the flow disclosed, rotation of the turnplate 73 of the auxiliary tool-magazine 70 reduces the required steps involved in the tool changer 100 of the present disclosure changing a tool, improving efficiency.

Figure 8:
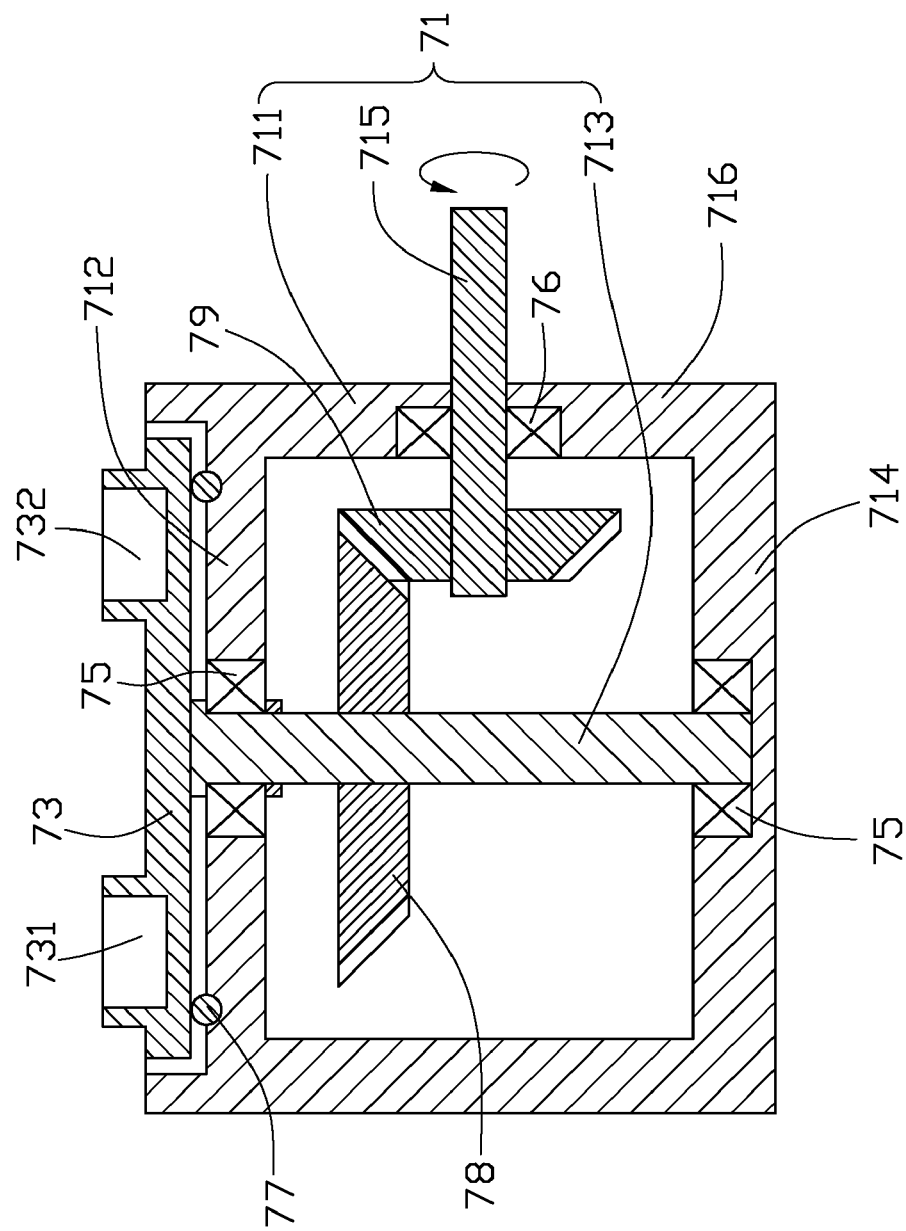
FIG. 8 is a sectional view of the auxiliary tool-magazine of FIG. 5.

Referring to FIG. 8, in one embodiment, the main body 71 of the auxiliary tool-magazine 70 includes a housing 711, a vertical first rotating shaft 713 mounted to the housing 711, and a horizontal second rotating shaft 715 mounted to the housing 711. First and second ends of the first rotating shaft 713 are rotatably mounted to a top wall 712 and a bottom wall 714 of the housing 711 via bearings 75 respectively, and the first end extends out of the housing 711 through the top wall 712 and firmly connects with a center of a bottom of the turnplate 73. A first bevel gear 78 is coaxially attached to the first rotating shaft 713. The second rotating shaft 715 is rotatably mounted to a sidewall 716 of the housing 711 via a bearing 76, perpendicular to the first rotating shaft 713. A first end of the second rotating shaft 715 is located outside the housing 711. A second end of the second rotating shaft 715 is located in the housing facing the first rotating shaft 713. A second bevel gear 79 is coaxially attached to the second end of the second rotating shaft. The first bevel gear 78 engages the second bevel gear 79.

In use, exerted torque rotates the second rotating shaft 715. The first rotating shaft 713 is rotated thereby via engagement between the first bevel gear 78 and the second bevel gear 79. The turnplate 73 is rotated together with the first rotating shaft 713. A plurality of ball bearings 77 located between the turnplate 73 and the top wall 712 of the housing 711 to ease rotation of the turnplate 73.

In other embodiments, the second rotating shaft 715, the first bevel gear 78, and the second bevel gear 79 may be omitted, with torque directly exerted on the first rotating shaft 713 to rotate the turnplate 73. For example, a servomotor (not shown) may be received in the housing 711 to rotate the first rotating shaft 713.

Figure 9:
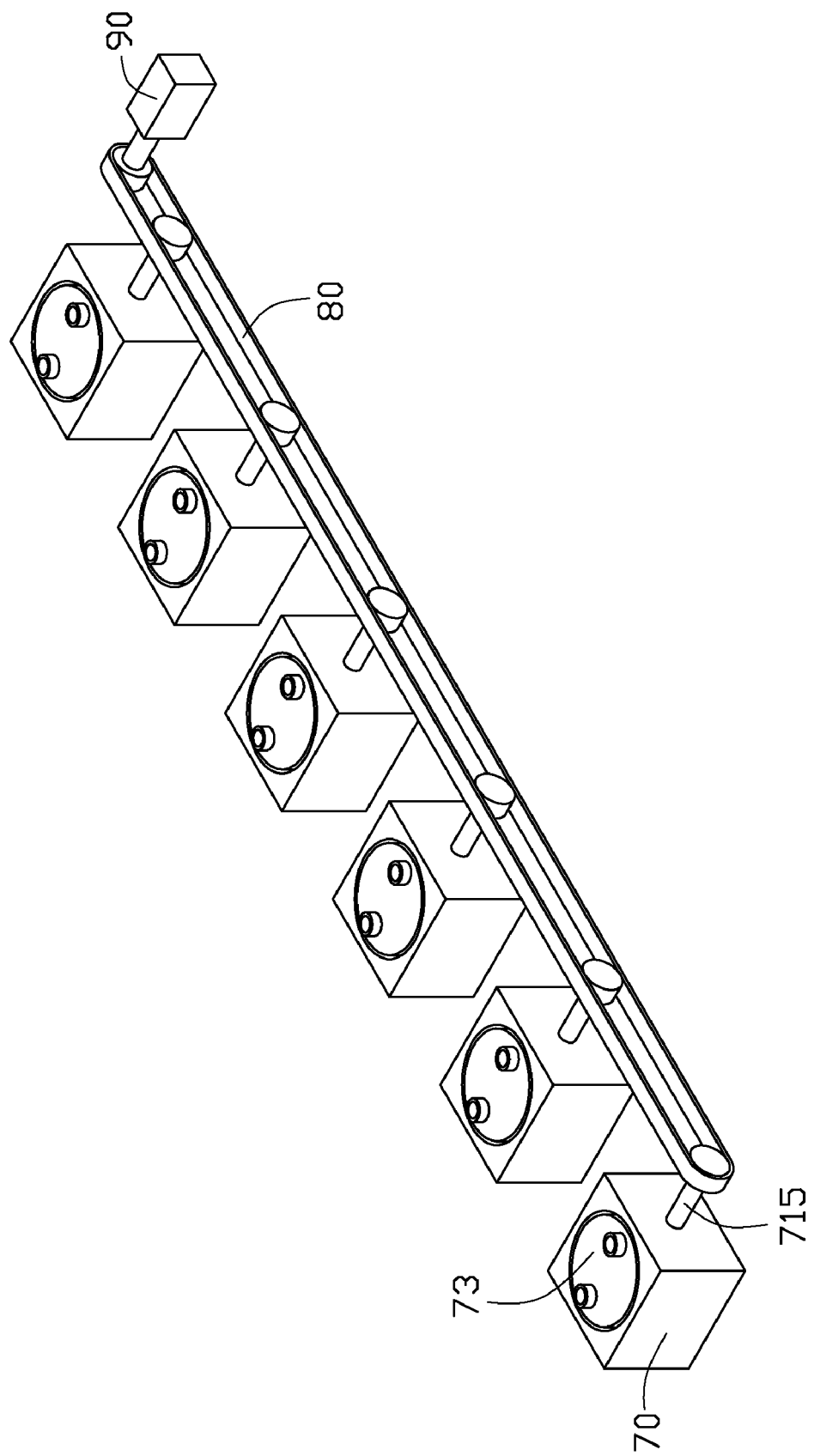
FIG. 9 shows a plurality of auxiliary tool-magazines that are synchronously employed.
Figure 10:
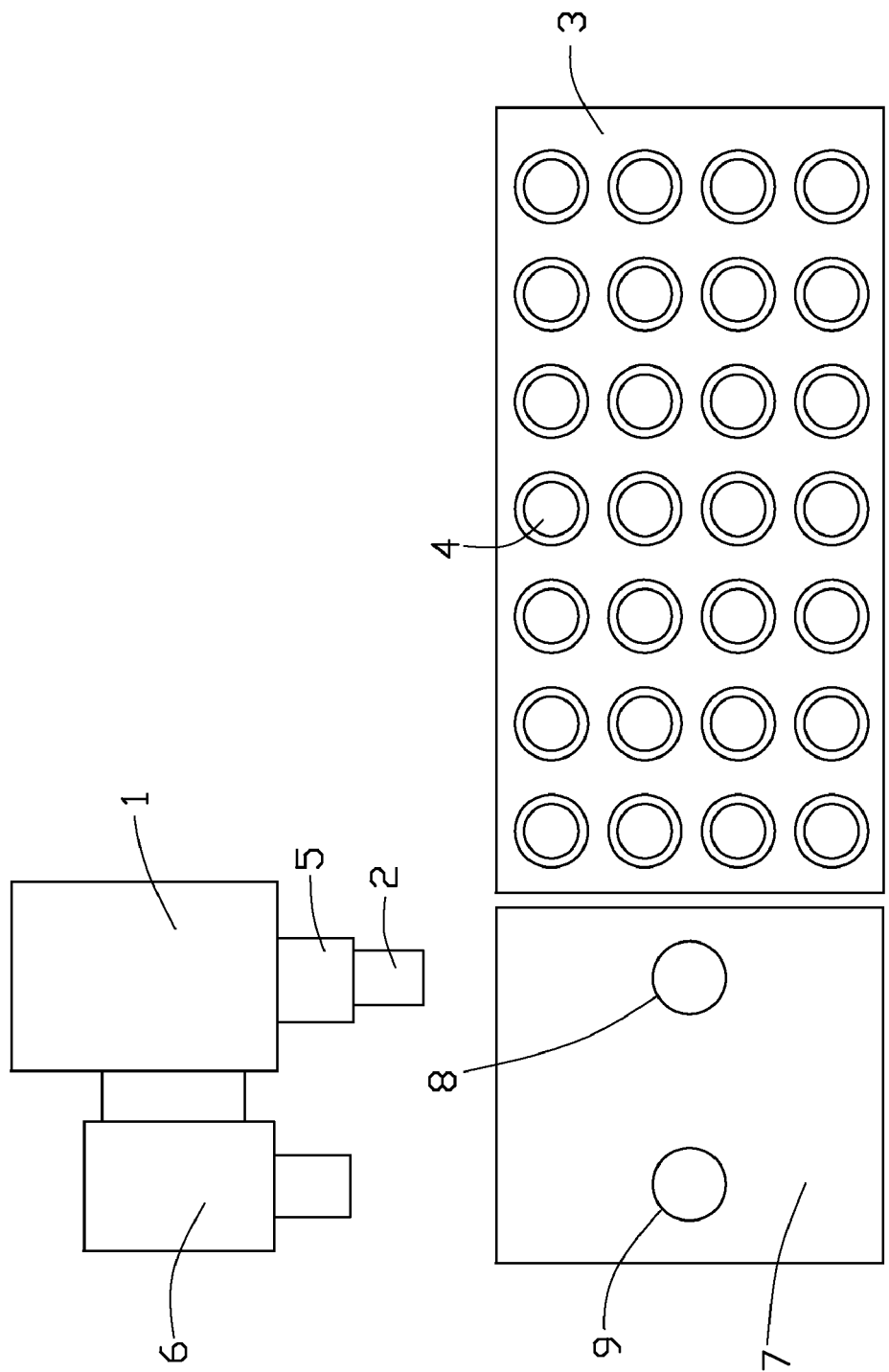
FIG. 10 is a schematic drawing of a commonly used tool changer.

Referring to FIG. 9, in a production line, more than one drill machine may be cooperatively deployed, with more than one auxiliary tool-magazines 70 being required accordingly. The auxiliary tool-magazines 70 are connected in series via a chain or a belt 80 engaging the second rotating shafts 715 thereof. A servomotor 90 drives the chain or belt 80 to rotate the turnplates 73 of the auxiliary tool-magazines 70.

It is to be understood, however, that even though numerous characteristics and advantages of the disclosure have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A tool change method, comprising:
   providing a first tool being fixed in a first collet of a spindle;
   providing a plurality of second tools seated in tool-seats of a tool-pan;
   relocating an auxiliary arm over the tool-pan;
   relocating a second collet of the auxiliary arm toward the tool-pan to retrieve one of the plurality of second tools;
   elevating the second collet of the auxiliary arm;
   relocating the spindle and the auxiliary arm over a first tool-carrier and a second tool-carrier of an auxiliary tool-magazine, respectively;
   lowering the first collet of the spindle to deposit the first tool into the first tool-carrier, and lowering the second collet of the auxiliary arm to deposit the second tool into the second tool-carrier;
   elevating the first collet of the spindle and the second collet of the auxiliary arm, and rotating a turnplate of the auxiliary tool-magazine to exchange the positions of the first tool-carrier and the second tool-carrier;
   lowering the first collet of the spindle to retrieve the tool carried in the second tool-carrier, and lowering the second collet of the auxiliary arm to retrieve the first tool carried in the first tool-carrier;
   elevating the first collet of the spindle and the second collet of the auxiliary arm;
   relocating the auxiliary arm over the vacated tool-seat of the tool-pan; and
   lowering the second collet of the auxiliary arm to deposit the first tool into the vacant tool-seat.

2. The tool change method of claim 1, wherein the auxiliary tool-magazine comprises a main body, the turnplate being rotatable relative to the main body, the first tool-carrier is attached to the turnplate, and the second tool-carrier is attached to the turnplate.

3. The tool change method of claim 2, wherein the main body of the auxiliary tool-magazine comprises a housing and a first rotating shaft rotatably mounted to the housing, wherein the turnplate is fixed to an end of the first rotating shaft.

4. The tool change method of claim 3, wherein the housing comprises a top wall, wherein the end of the first rotating shaft extends through the top wall to an outside of the housing to be fixed to the turnplate.

5. The tool change method of claim 4, wherein a plurality of ball bearings is employed between the turnplate and the top wall to ease rotation of the turnplate.

6. The tool change method of claim 3, wherein the main body of the auxiliary tool-magazine further comprises a second rotating shaft rotatably mounted to the housing, the second rotating shaft is perpendicular to the first rotating shaft, a first bevel gear is attached to the first rotating shaft, a second bevel gear is attached to the second rotating shaft and engaged with the first bevel gear of the first rotating shaft.

7. The tool change method of claim 6, wherein an end of the second rotating shaft opposite to the second bevel gear extends outside the housing.

8. The tool change method of claim 7, wherein the first and second rotating shafts engage the housing via a plurality of bearings, so as to be rotatably mounted to the housing.

* * * * *